Figure 1:
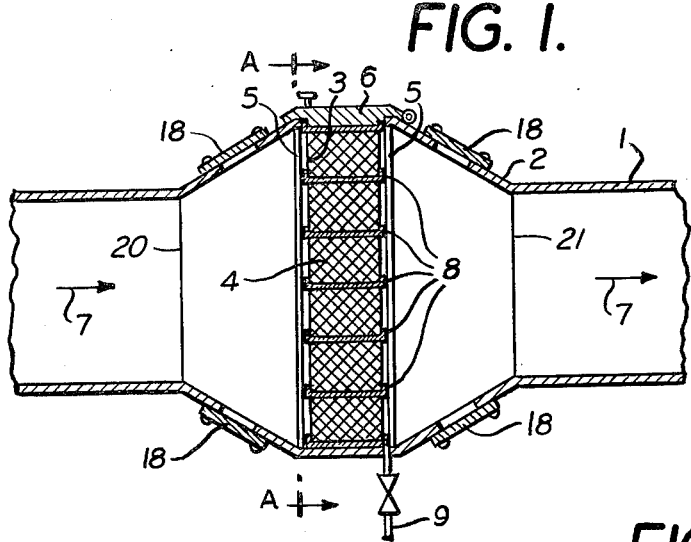

United States Patent [19]

Bürkholz et al.

[11] 4,018,580
[45] Apr. 19, 1977

[54] SEPARATOR FOR SEPARATING LIQUID DROPLETS FROM A STREAM OF GAS

[75] Inventors: Armin Bürkholz, Cologne; Wolfgang Dieter Müller, Leverkusen, both of Germany

[73] Assignee: Bayer Aktiengesellschaft, Leverkusen, Germany

[22] Filed: Sept. 16, 1974

[21] Appl. No.: 506,625

Related U.S. Application Data

[63] Continuation-in-part of Ser. No. 341,439, March 15, 1973, abandoned.

[30] Foreign Application Priority Data

| Mar. 20, 1972 | Germany | 2215679 |
| Mar. 27, 1973 | Netherlands | 7304266 |
| Mar. 29, 1973 | Belgium | 129414 |
| Mar. 30, 1973 | France | 73.11677 |
| Mar. 27, 1973 | Japan | 48-34201 |
| Mar. 28, 1973 | United Kingdom | 14861/73 |
| Mar. 28, 1973 | Canada | 167416 |

[52] U.S. Cl. .................. 55/321; 55/332; 55/423; 55/426; 55/430; 55/440; 55/464; 55/466; 55/481; 55/525

[51] Int. Cl.² ........................... B01D 50/00

[58] Field of Search ........... 55/185, 422, 466, 436, 55/481, 440, 483, 484, 525, DIG. 25, 259, 423, 426, 321, 325, 326, 328, 332, 430, 464, 465, 503, 322

[56] References Cited

UNITED STATES PATENTS

| 549,390 | 11/1895 | Patterson et al. | 55/481 X |
| 907,634 | 12/1908 | Narowetz | 55/259 X |
| 1,913,885 | 6/1933 | Jordahl | 55/484 X |
| 1,968,778 | 7/1934 | Caldwell | 55/484 X |
| 2,163,600 | 6/1939 | How | 55/481 X |
| 2,271,662 | 2/1942 | Rubissow | 55/525 X |
| 2,921,647 | 1/1960 | Pietrasz | 55/440 X |
| 3,304,696 | 2/1967 | McKenna | 55/466 X |
| 3,392,509 | 7/1968 | Pelosi, Jr. | 55/481 X |
| 3,559,379 | 2/1971 | Lambert | 55/259 X |
| R18,328 | 1/1932 | Fedeler | 55/484 X |

*Primary Examiner*—Frank W. Lutter
*Assistant Examiner*—Kathleen J. Prunner
*Attorney, Agent, or Firm*—Burgess, Dinklage & Sprung

[57] ABSTRACT

To increase the degree of separation of liquid droplets from a stream of gas by means of a separator consisting of a packet of wire gauze arranged in a pipe, the packet is subdivided along its height by discharge channels arranged transverse to the direction of flow.

13 Claims, 5 Drawing Figures

SEPARATOR FOR SEPARATING LIQUID DROPLETS FROM A STREAM OF GAS

This application is a continuation-in-part of application Ser. No. 341,439, filed Mar. 15, 1973 and now abandoned.

BACKGROUND

This invention relates to a separator for separating liquid droplets from a stream of gas, which separator consists of a packet of wire gause arranged vertically in a pipe and provided with an outlet.

The purpose of such separators is to purify streams of gases from droplets of liquid in cyclic processes and to purify streams of gases which are discharged into the atmosphere in order to prevent environmental pollution.

The pipes are usually arranged vertically in the region of the packet of wire gauze and the packet itself is arranged perpendicular to the wall of the pipe. The gas stream containing droplets is passed upwards from below. The droplets are deposited on the wire gauze and coalesce to form a film and rain down in the form of large drops against the stream of gas. The velocity of the gas stream is thereby limited to a maximum of 4 m/sec because the droplets would otherwise be carried upwards by the purified gas. Owing to the low gas velocity, only droplets with a minimum diameter of $2\mu m$ can be removed.

In order to improve the discharge of the liquid which has been separated from the gas, it has already been attempted to arrange the packet of wire gauze vertically and pass the gas through it in a substantially horizontal direction. The film of liquid then trickles down through the packet of wire gause under gravity. If the outflow paths are too long, i.e. if the packet is too high and especially if it has a small cross-section, the film of liquid becomes too thick, especially in the lower part of the packet of wire gauze, so that the liquid breaks away from the film and is carried along by the gas stream in the form of drops. The flow of gas through the packet is therefore again limited to low velocities so that the degree of separation of the droplets from the gas is reduced. If the velocity of the stream is not kept low, the desired effect of obtaining efficient separation also at relatively higher gas velocities would not be achieved.

THE INVENTION

It is therefore an object of this invention to provide a separator which would allow for at least an equally good but preferably higher degree of separation at higher gas velocities than have previously been possible without the separated liquid being carried away again by the stream of gas.

According to the invention, this problem is solved by disposing discharge channels in the packet to subdivide the packet of wire gauze along its height. The discharge channels are arranged transverse to the direction of flow of the gas. The pipe extends horizontally and may be arranged with a slight upward slope, up to 45°, or downward slope, again up to 45° in the region of the separator but is preferably arranged substantially horizontally. The term "vertical" applied to the arrangement of the packet of wire gauze should not be taken exactly but understood to include deflections of up to ±45° from the vertical.

The subdivision of the packet into individual packet elements has the advantage that if the pipe has a wide internal diameter, the height of downflow of the liquid film is reduced according to the number of subdivisions. The thickness of the liquid film is therefore restricted and the danger of separation of droplets reduced.

If the packet of wire gauze is subdivided into individual packet elements of small height, a better degree of separation is also achieved because, as the droplets are deposited on the first layers of wire at the inflow end and, as is usually the case, become detached partly again and are redeposited across the whole thickness of the packet, most of the droplets reach the discharge channels under the action of gravity before they reach the last layers of wire gauze so that the purified stream of gas no longer contains any drops of liquid and the provision of a coarse separator arranged after the first separator which has previously been necessary is now reduced or substantially obviated.

The discharge channels are preferably set at an angle to the horizontal towards one side wall of the pipe. This promotes the discharge flow of the collected liquid. The angle of inclination should be sufficient to ensure that the gradient causes rapid downflow of the collected liquid.

According to another preferred embodiment, the discharge channels, viewed in the direction of flow, have shields arranged at the inflow end of the packet of wire gauze. The shields facilitate the discharge of the film of liquid at the inlet end of the wire packet, because, in the shielded area of the packet, there is almost no gas flow and the liquid film cannot therefore be torn away.

Lastly, according to another feature of the invention, the discharge channels are provided with shields at the outflow end of the wire packet, viewed in the direction of flow. Here again, the shields provide a zone free from gas flow like the shields at the inlet end, and this again promotes the discharge of liquid. In addition, these shields serve to catch any droplets which have become separated and which would otherwise be carried into the purified gas stream. The discharge channels may, of course, be provided with shields both at the inlet end and at the outlet end of the wire packet. The shields at the outlet end are preferably in the form of baffle plates with collecting grooves because any drops which have broken away are generally larger than 100 $\mu m$ and therefore collect on baffle plates provided with collecting grooves.

This embodiment of separator, if arranged vertically, can be operated with gas velocities of up to and over 10 m/sec without any drops being carried into the purified gas stream. With suitable choice of shields, preferably determined empirically especially as regards their height, the rate of gas flow can be increased to the optimum velocity for separation of the droplets so that the separator can also be operated with varying rates of gas flow. The separator is preferably arranged in a section of pipe which is increased in width to form a housing. This has the advantage that the internal cross-sectional area available in the separator for the flow of gas through it can be adapted to the flow cross-section of the pipe. Since the discharge for the liquid is preferably arranged at the lowest point of the wider part of the pipe, the wire gauze packet can be washed in situ with washing liquid during intervals between operation if suitable access openings which can be closed are provided in this wide portion. The washing liquid is then removed from this portion of pipe through the discharge outlet.

According to another special embodiment of the invention, the packet of wire gauze is arranged in a frame which is mounted in guide rails of the pipe or of the wide section of the pipe in such a way that it can be removed. In this way, the whole separator can easily be removed, cleaned or replaced.

Figure 3:
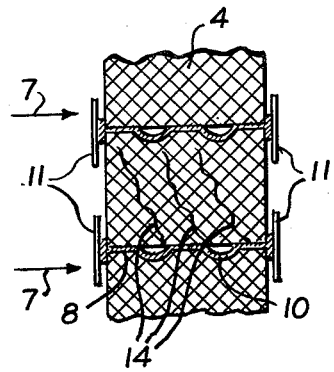
Figure 4:
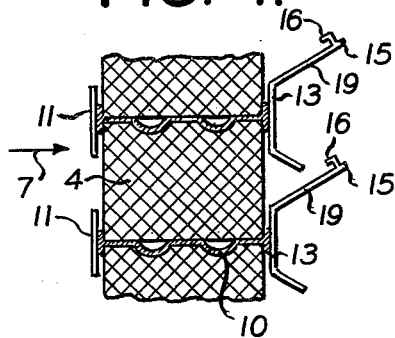
Figure 5:
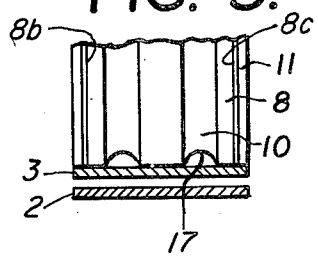

A constructional example of the separator according to the invention is illustrated diagrammatically in a drawing and explained below. In the drawing, FIG. 1 represents a longitudinal section through a pipe with subdivided wire gauze packet, FIG. 2 represents a section on the line A — A in FIG. 1 showing the pipe inclined at an angle a with respect to the horizontal, FIG. 3 represents a cross-section through a portion of the wire gauze packet shown in FIGS. 1 and 2 but on an enlarged scale and provided with shields, and as seen if viewed along line B—B in FIG. 2, FIG. 4 represents the wire gauze packet according to FIG. 3 but with shields at the outflow end in the form of baffle plates, and as seen if viewed along line B—B in FIG. 2, and FIG. 5 is a plan view of an end portion of a discharge channel disposed in the packet as seen if viewed along line 5—5 in FIG. 2, with the gauze removed.

Figure 2:
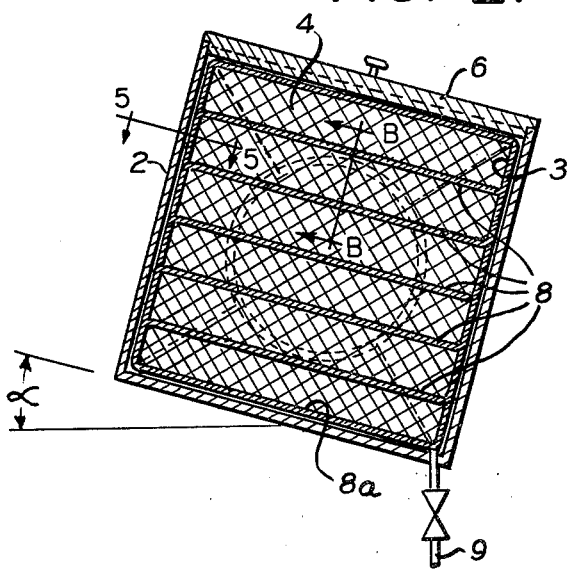

In FIGS. 1 and 2 the separator comprises a funnel-shaped pipe section 2 which is assembled with a horizontal pipe 1 having pipe inlet 20 and a pipe outlet 21 for passage of a gas stream therethrough. The funnel-shaped pipe section 2 forms a housing which contains a frame 3 with wire gauze packet 4. The frame 3 is supported in guide rails 5 and can be removed through an aperture 6 which is adapted to be closed. The wire packet 4 is subdivided by discharge channels 8 arranged transverse to the direction of gas flow along the flow path indicated by the arrow 7.

The housing 2 with frame 3, wire packet 4 and discharge channels 8 is inclined sideways at an angle a of 15° towards a second outlet 9. The inclination of the discharge channels 8 assists the flow of separated liquid into the outlet 9.

As shown in FIG. 2, the packet 4 is rectangular as viewed in the direction along the pipe axis, and is inclined with respect to the horizontal, and outlet 9 is disposed at the lowermost corner of the packet. The discharge channels 8 are disposed parallel to the lowermost base 8a of the wire gauze packet. As can be seen in FIG. 2, the pipe section 2 at a location where the packet is disposed, conforms to the configuration of the packet.

In FIG. 3, the discharge channels 8 having two side edges 8b and 8c, have collecting grooves 10. Shields 11 are arranged at the gas inlet side and gas outlet side of the wire packet 4, and prevent the gas from picking up liquid flowing in the discharge channels 8. Also, the gas stream is constricted by the shields 11 at the inlet side and at the outlet side and forced to flow more rapidly through the wire packet 4. The liquid trapped in the wire packet trickles downward diagonally to the direction of the stream in the form of films 14 and enters the collecting grooves 10 of the discharge channels 8. The collecting grooves 10 convey the liquid to the side of the wire gauze packet, and the liquid drains from the collecting channels 8 via drain openings 17, shown in FIG. 5.

FIG. 4, shield 11 is provided on the inlet side, and baffles 19 are provided on the outlet side. The baffles 19 have intermediate sections 13 which serve as shields. Any drops of liquid which have separated from the wire packet 4 are trapped by the baffles. Additional collecting grooves 16 prevent the liquid from washing over the edge 15.

Access openings 18 are provided in pipe section 2 for permitting access to the separator for washing of the wire gauze packet 4.

What we claim is:

1. A separator for separating liquid droplets from a gas stream comprising:
   a. a horizontally extending pipe section having a pipe inlet and a pipe outlet for passage of said gas stream therethrough, having a gauze packet disposed in the pipe section substantially vertically across the flow path through the pipe for separating of liquid from gas passing through the pipe,
   b. at least one discharge channel extending across the gauze packet disposed at an intermediate level in the gauze packet for receiving the liquid separated by the gauze above the discharge channel and conveying the liquid transverse to the direction of gas flow to the side of the gauze packet, said discharge channel being inclined at an angle to the horizontal for facilitating said conveyance,
   c. and a second outlet from the pipe section, said second outlet communicating with the lowermost part of the gauze packet, and being for receiving separated liquid conveyed to said side of the gauze packet and discharge of the separated liquid from the separator.

2. A separator according to claim 1, said discharge channel having two side edges extending transverse to the direction of gas flow, and a shield disposed along one of the side edges to prevent gas from picking up liquid conveyed by the discharge channel.

3. A separator according to claim 2, in which the discharge channel has a shield at both of the side edges thereof.

4. A separator according to claim 1, said discharge channel having two side edges extending transverse to the direction of gas flow, and a baffle disposed along one of the side edges for trapping drops of liquid which separate from the gauze packet.

5. A separator according to claim 1, the pipe section including a widened portion intermediate the ends thereof, the gauze packet being disposed in said widened portion.

6. A separator according to claim 1, the gauze packet being disposed in a frame therefor, the pipe section having guide rails for the frame, the gauze packet being removably mounted in the pipe section guide rails.

7. A separator according to claim 1, the pipe section having a closable access opening permitting washing of the gauze in situ.

8. A separator according to claim 1, the gauze packet being rectangular and having four corners, and four sides defining said rectangle, as viewed along the pipe axis, and being disposed with one of said rectangle sides thereof inclined with respect to the horizontal so that one of said corners is disposed lower than the remaining three corners, said second outlet being disposed at the lowermost corner of the gauze packet the pipe section at the location where the packet is disposed conforming to the configuration of the packet.

9. A separator according to claim 8, the discharge channel being disposed parallel to the lowermost base of the gauze packet.

10. A separator according to claim 8, and a pipe, the separator being assembled with the pipe for passage of fluid which flows through the pipe, through the separator.

11. A separator according to claim 1, the discharge channel having at least one collecting groove for said conveyance of the liquid transverse to the direction of flow.

12. A separator according to claim 1, having a plurality of said discharge channels which are disposed at spaced intervals within the gauze.

13. A separator according to claim 1, and a pipe, the separator being assembled with the pipe for passage of fluid which flows through the pipe, through the separator.

* * * * *